(12) United States Patent
Little et al.

(10) Patent No.: US 6,920,050 B2
(45) Date of Patent: Jul. 19, 2005

(54) COVER FOR MODULAR RACK APERTURES

(75) Inventors: Kevin Little, Ipswich (GB); Andrew Bothwell, Ipswich (GB)

(73) Assignee: Agilent Technologies, Inc., Palo Alto, CA (US)

( * ) Notice: Subject to any disclaimer, the term of this patent is extended or adjusted under 35 U.S.C. 154(b) by 49 days.

(21) Appl. No.: 10/448,684

(22) Filed: May 30, 2003

(65) Prior Publication Data
US 2004/0066639 A1 Apr. 8, 2004

(30) Foreign Application Priority Data

Oct. 2, 2002 (EP) .............................................. 02256856

(51) Int. Cl.[7] .............................. H05K 1/14; H05K 7/00; H05K 1/00; H05K 1/18
(52) U.S. Cl. ........................ 361/736; 361/728; 361/748; 361/752
(58) Field of Search ................................ 361/683–686, 361/724–732, 733, 736, 740, 741, 747, 748, 752, 753, 756, 759, 787, 788, 791, 796–802, 807, 816, 818, 687–695; 174/35 R, 35 GC, 50, 50.52; 312/223.1, 223.2; 211/41.17

(56) References Cited

U.S. PATENT DOCUMENTS

| | | | |
|---|---|---|---|
| 4,935,845 A | * 6/1990 | Schwehr et al. ............ | 361/694 |
| 6,253,284 B1 | 6/2001 | Hsu ............................ | 711/115 |
| 6,273,759 B1 | 8/2001 | Perino et al. ................ | 439/631 |
| 6,291,766 B1 | * 9/2001 | Komai ....................... | 174/35 R |
| 6,483,024 B1 | * 11/2002 | Smithson et al. ...... | 174/35 GC |
| 6,768,651 B2 | * 7/2004 | Takahashi et al. ........... | 361/801 |
| 2001/0021105 A1 | 9/2001 | Ikeda .......................... | 361/772 |
| 2002/0009905 A1 | 1/2002 | Poplawski et al. ......... | 439/76.1 |
| 2004/0032715 A1 | * 2/2004 | Ice .............................. | 361/686 |

FOREIGN PATENT DOCUMENTS

| | | |
|---|---|---|
| EP | 1241502 A1 | 9/2002 |
| GB | 2299459 | 10/1996 |

* cited by examiner

Primary Examiner—Phuong T. Vu

(57) ABSTRACT

A dummy module is inserted into an open slot in a modular rack to provide a cover for that slot. The dummy module is formed of the same housing as an operational module and contains a similar PCB as an operational module, without all the electrical and electronic components mounted thereon that an operational module would have. The PCB may have no components and no electrical tracks thereon, or it may be provided with some limited functionality. The PCB may have a memory device, such as an Electrically Erasable Programmable Read only Memory (EEPROM) mounted thereon, with at least an electrical track leading thereto from the connector block to enable a rack controller to interrogate the EEPROM. Thus, the rack controller would receive a positive identification from the EEPROM that the particular slot is empty, rather than simply trying to interrogate the slot and receiving no answer whatsoever.

5 Claims, 4 Drawing Sheets

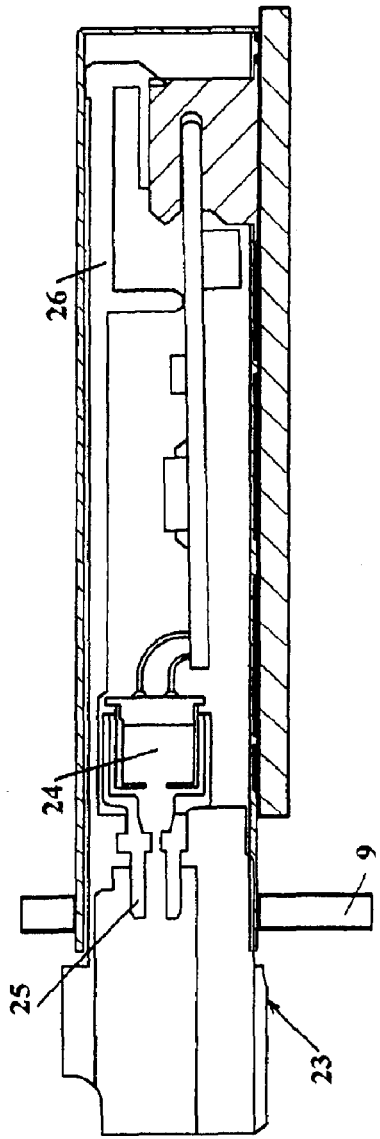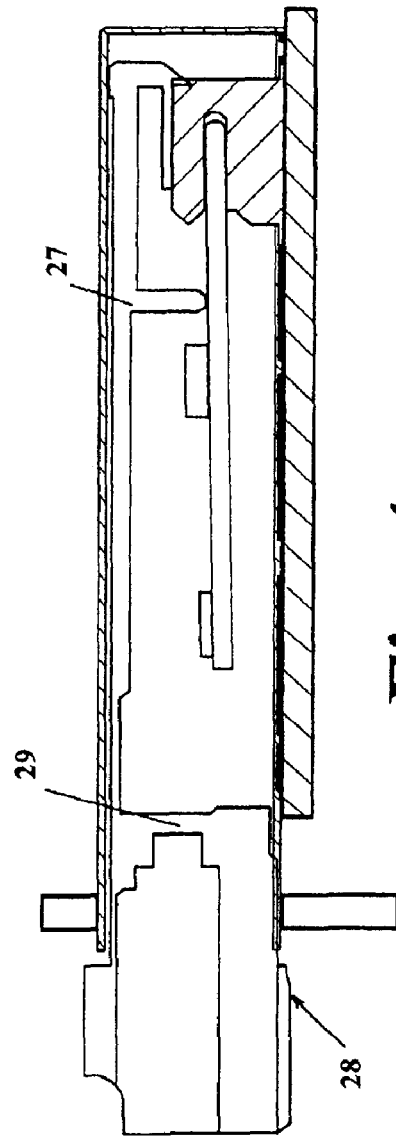

COVER FOR MODULAR RACK APERTURES

FIELD OF THE INVENTION

This invention relates to a cover for modular rack apertures, particularly, though not exclusively, for apertures in electrical or electro-optical modular rack systems.

BACKGROUND OF THE INVENTION

Many electrical or electro-optical systems being developed today are modular. This gives an end customer the ability to have a low cost start up solution, to scale up if conditions demand and to upgrade/replace/mix the modules as required. The flexibility of the modular system is achieved by using modules, which plug into a rack system. Each rack has multiple apertures (or ports), which can be filled individually as necessary. When a rack is full, another may be acquired to allow for further expansion.

One problem with such a modular rack system is that some of the ports may be unused and left open. Without a port plug, this leaves an aperture through which Radio Frequency emissions can escape. These emissions can cause the system to fail the Electromagnetic Compatibility (EMC) directive, which is a standard that puts limits on the amount of emissions that can be allowed to escape.

With some racks, such as, for example, Small Form Factor Pluggable (SFP) devices, the module cage can project beyond the front face of the rack so that the rack cannot be provided with a flap or plate to cover the aperture of the unused cage. Such an open aperture also allows entry of dust into the rack, which can affect other modules within the rack as forced air cooling is often used for the whole rack. A secondary effect of an open aperture that can occur is disturbance of the airflow within the rack which may cause unforeseen hotspots since the thermal operation of the rack is generally designed to work optimally when the rack is fully loaded. This may be insignificant for the SFP platform where each module socket is surrounded by a cage, but on other pluggable devices it may have greater importance.

It is known to provide dust covers, which are often rubber or plastics mouldings, and may be metallised if they are intended to prevent EMI, but such covers are usually provided on an ad hoc basis are rarely match the remainder of the modules in the rack. Furthermore, they do not always meet requirements that may be set for the mechanical compression forces that the cover must be able to handle.

BRIEF SUMMARY OF THE INVENTION

Accordingly, in a first aspect, the invention provides a cover for a port in a modular system, the cover comprising a dummy module having an outer housing with substantially the same outer dimensions as an operational module that would fit into the port in the modular system, wherein the dummy module includes a printed circuit board within the outer housing, the printed circuit board having substantially the same dimensions as those of a printed circuit board of an operational module.

The printed circuit board may include at least a memory component mounted thereon and electrical conductors on the printed circuit board coupled to the memory component for allowing a controller of the modular system to communicate with the memory component, when the dummy module is in position in the modular system.

The printed circuit board may include resistive termination for containing signals passing thereto from the modular system, when the dummy device is in position in the modular system.

The outer housing may comprise an outer housing that could be used to form an operational module.

In one embodiment, the outer housing includes an aperture therein, that, in an operational module, would allow an optical connection to be made there through, the aperture of the dummy module being closed off.

The aperture may be closed off by means of a plug.

BRIEF DESCRIPTION OF THE DRAWINGS

One embodiment of the invention will now be more fully described, by way of example, with reference to the drawings, of which:

FIG. 3 shows a schematic cross-sectional view through a single enclosure having a different operational module therein than the one of FIGS. 1 and 2;

FIG. 4 shows a schematic cross-sectional view through the modular rack of FIG. 1 closed by a cover according to a second embodiment of the present invention;

DETAILED DESCRIPTION OF THE DRAWINGS

Figure 1:
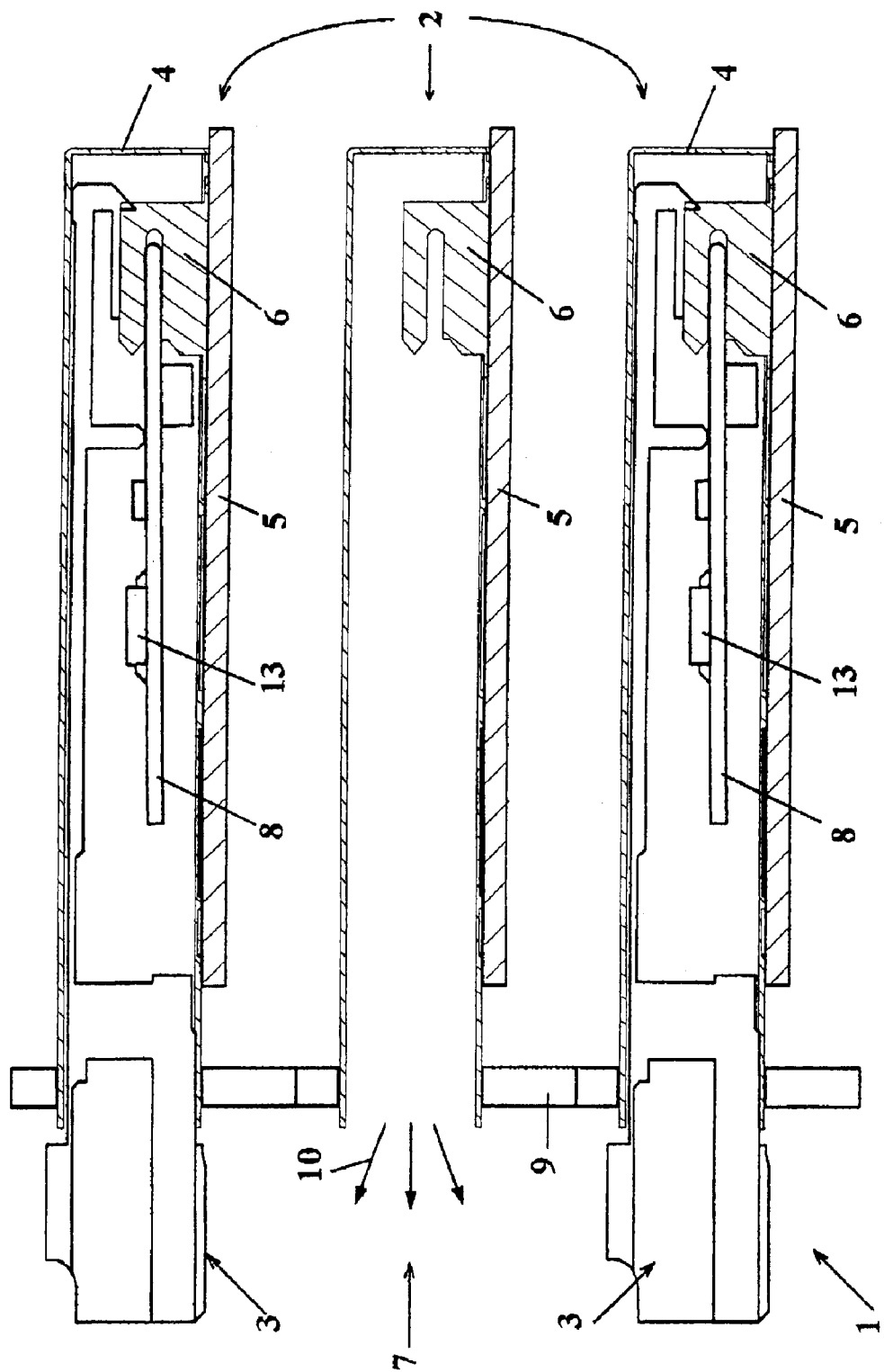
FIG. 1 shows a schematic cross-sectional view through a modular rack having an open port.

Thus, as shown in FIG. 1, a modular rack 1 has a number of slots 2 (of which three are shown) for receiving operational modules 3 (of which are two are shown). Each slot 2 is formed by a cage 4 mounted on a motherboard 5 and a connector block 6 within the cage 4. An open end 7 of the cage 4, through which the operational module 3 can be inserted into the slot 2 is surrounded by a bulkhead 9 forming part of the structure of the rack 1. The motherboards 5 are also electrically connected together, possible also to an overall controller device (not shown).

The connector blocks 6 provide a mechanical support for a printed circuit board (PCB) 8 of an operational module 3 and also serve to provide electrical connections between the motherboard 5 and electrical tracks on the PCB leading to various electrical and/or electronic components 13 on the PCB.

The open end 7 of a slot not having an operational module 3 there within, allows dust to enter the slot and electromagnetic radiation to exit the slot (as shown by arrows 10). As described above, there can be strict limits on the amount of such electromagnetic radiation that can be emitted. Dust settling in the empty slot can, of course, means that the slot will be dirty if it is desired to insert an operational module into the slot at a later time, so that it is possible that the electrical connections between the PCB of the operational module and the motherboard may be impeded. Furthermore, depending on the internal structure of the rack, dust may be able to reach other slots and other parts of the rack, where it can also cause problems in operation.

Figure 2:
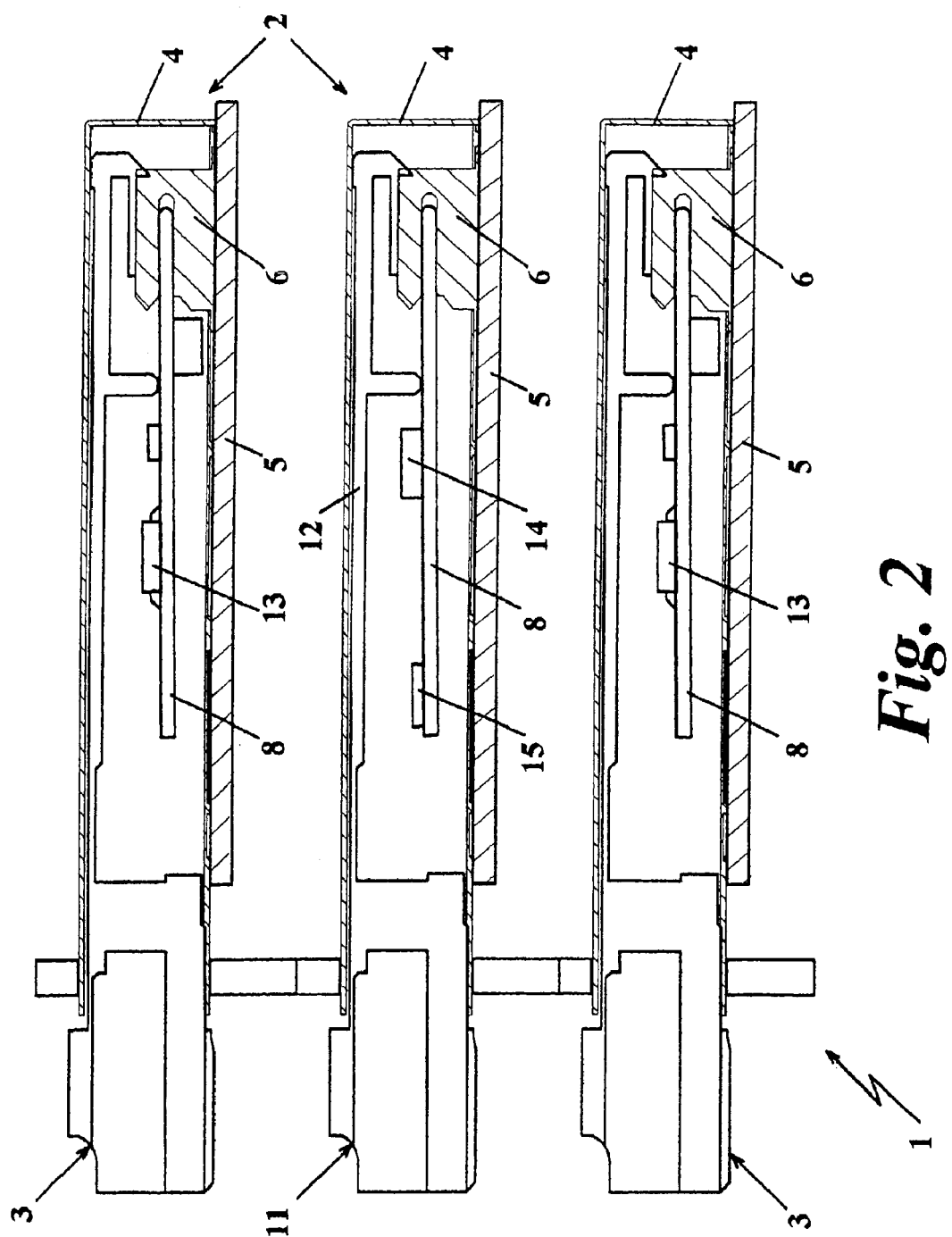
FIG. 2 shows a schematic cross-sectional view through the modular rack of FIG. 1 with the open port closed by a cover according to one embodiment of the present invention.

Accordingly, in a first embodiment of the present invention, as shown in FIG. 2, a dummy module 11 is inserted into the open slot to provide a cover for that slot. The dummy module 11 is formed of the same housing 12 as an operational module and contains a similar PCB 8 as an operational module, except that the PCB will not have all the electrical and electronic components mounted thereon that an operational module would have. The PCB 8 may be completely bare of all components and have no electrical tracks thereon, or it may be provided with some limited functionality. For example, the PCB 8 may have a memory device, such as an Electrically Erasable Programmable Read only Memory (EEPROM) 14, mounted thereon, with at least an electrical track leading thereto from the connector block 6 to enable the rack controller to interrogate the EEPROM 14. Thus, the rack controller would receive a positive identification from the EEPROM 14 that the particular slot is empty, rather than simply trying to interrogate the slot and receiving no answer whatsoever. Furthermore, the PCB 8 can also be provided with resistive terminations 15 to contain any electrical Input/Output (I/O) signals from the rack controller passing through the connector block 6 to the slot, so that they are not emitted from the rack, but dissipated within the dummy module.

It will be apparent that, because the outer housing and PCB of an operational module is used for the dummy module, the mechanical (including thermal) and electrical properties of the dummy module will be substantially the same as those of the operational modules. Therefore, if the operational modules have metal housings, for example as in the case of SFP devices, the dummy SFP device will also have a metal housing, of the same properties as the operational device. Furthermore, since the modules are often designed to produce particular thermal effects within the rack, for example to provide particular airflow through the rack to reduce the hotspots there within, the use of substantially identical dummy modules means that the thermal properties of the rack are not compromised. The lateral dimensions of an outer portion of the housing of the dummy module are therefore of a similar size to those of an operational module and cover the aperture in the same fashion as an operational module would. Furthermore, if the operational module includes a gasket, for example an EMI gasket to seal around the aperture, the dummy module can be similarly provided with a gasket so as to have the same properties as the operational module. Therefore, such a cover will look the same as an operational module and will match the remainder of the operational modules arranged in the rack.

FIG. 3 shows a different operational module 23 to that shown in FIG. 1. In this case, the operational module 23 has an optoelectronic component 24 mounted on the PCB 8. The optoelectronic component 24 includes a connector portion 25, which extends through an aperture in the outer housing 26 of the operational module 23 so that an optical fibre connector (not shown), for example, can mate with the connector portion from the outside of the rack. It will be appreciated, therefore, that if the same outer housing were to be used to form a dummy module to cover the open end of a slot, the aperture would still allow dust, etc to enter the rack system.

Therefore, as shown in FIG. 4, the outer housing 27 of the dummy module 28 can be modified by blanking off the aperture by, for example, providing a wall 29 to cover the aperture. The wall 29 can be made integrally with the outer housing 27, or can be attached to the outer housing to cover the aperture at a later time. With such a wall 29 in place, the dummy module 28 is sealed against dust entering and against emission there from. Furthermore, if an optical fibre connector were to be inserted into the outer housing, whether by accident or design, it would not be damaged and could, if desired remain in position to give the appearance of an operational module.

Figure 5:
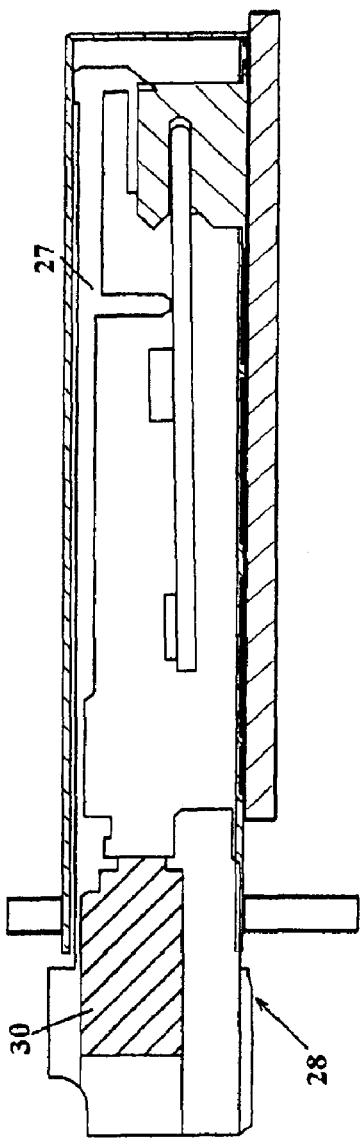
FIG. 5 shows a modification of the cover of FIG. 4.

Alternatively, as shown in FIG. 5, a separate plug 30 can be inserted into the outer housing 27 so as to block off the aperture. Such a plug can be made of metal or partly metallised so as to provide the required EMI characteristics. The position of such a plug extending forward of the aperture so that it was clearly visible, would also discourage the insertion of an optical fibre connector thereby precluding possible damage to such a connector by the plug.

Figure 6:
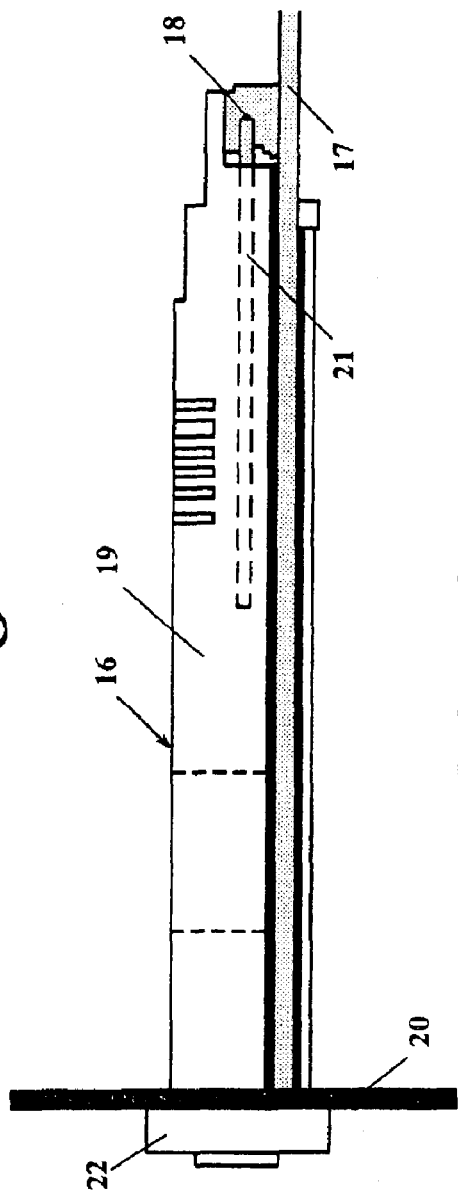
FIG. 6 shows a cover according to a fourth embodiment of the present invention.

FIG. 6 shows a fourth embodiment of a cover 16 for an aperture in a modular rack. In this FIG, only one slot is shown, having a motherboard 17 extending from a front panel 20 with a connector block 18 mounted on the motherboard 17. The cover 16 is formed by a dummy module having a housing 19 extending into the slot, with an outer portion 22 of the housing 19 closing off the aperture. A PCB 21 is positioned within the housing 19 and extends from the housing 19 so as to connect to the connector block 18, thereby to retain the cover in position. It will be seen that, in this embodiment, there is no cage surrounding the slot, as in the previous embodiment. However, the dummy module extends above and below the motherboard, which therefore acts as a guide rail for the dummy module.

It will be appreciated that although only a few particular embodiments of the invention have been described in detail various modifications and improvements can be made by a person skilled in the art without departing from the scope of the present invention. For example, although the modular rack has been illustrated as having the slots arranged vertically on top of each other, it will be appreciated that the slots could alternatively or additionally be arranged sideways next to each other.

What is claimed is:

1. A cover for a port in a modular system, the cover comprising a dummy module having an outer housing with substantially the same outer dimensions as an operational module that would fit into the port in the modular system, wherein the dummy module includes a printed circuit board within the outer housing, the printed circuit board having substantially the same dimensions as those of a printed circuit board of an operational module, and wherein the printed circuit board includes at least a memory component mounted thereon and electrical conductors on the printed circuit board coupled to the memory component for allowing a controller of the modular system to communicate with the memory component, when the dummy module is in position in the modular system.

2. A cover according to claim 1, wherein the printed circuit board includes resistive termination for containing signals passing thereto from the modular system, when the dummy device is in position in the modular system.

3. A cover according to claim 1, wherein the outer housing comprises an outer housing that could be used to form an operational module.

4. A cover according to claim 1, wherein the outer housing includes an aperture therein, that, in an operational module, would allow an optical connection to be made there through, the aperture of the dummy module being closed off.

5. A cover according to claim 4, wherein the aperture is closed off by means of a plug.

* * * * *